United States Patent [19]

Westrom

[11] Patent Number: 4,908,730

[45] Date of Patent: Mar. 13, 1990

[54] SURGE ARRESTER WITH SHUNT GAP

[75] Inventor: Arthur C. Westrom, Stone Mountain, Ga.

[73] Assignee: Kearney, Atlanta, Ga.

[21] Appl. No.: 298,463

[22] Filed: Jan. 18, 1989

Related U.S. Application Data

[63] Continuation-in-part of Ser. No. 257,974, Oct. 14, 1988, abandoned.

[51] Int. Cl.[4] .................................... H02H 3/22

[52] U.S. Cl. .................................... 361/120; 361/127

[58] Field of Search .............. 361/117, 118, 119, 120, 361/126, 127; 338/20, 31

[56] References Cited

U.S. PATENT DOCUMENTS

| | | | |
|---|---|---|---|
| 3,727,102 | 4/1973 | Westron | 361/127 |
| 4,100,588 | 7/1982 | Kresge | 361/127 |
| 4,161,012 | 7/1979 | Cunningham | 361/127 |
| 4,240,124 | 12/1980 | Westron | 361/117 X |
| 4,472,754 | 9/1984 | Mizukoshi et al. | 361/127 |
| 4,587,592 | 5/1986 | Nakano et al. | 361/127 |

*Primary Examiner*—Derek S. Jennings

*Attorney, Agent, or Firm*—Hurt, Richardson, Garner, Todd & Cadenhead

[57] ABSTRACT

A surge arrester of modular form, including a metal oxide varistor disk having a coaxial shunt gap located within the disk. The metal oxide varistor disk has a hole located essentially through the center of the disk and includes top and bottom electrode plates having centrally located projections which protrude inwardly of the disk into the hole of the disk, thereby forming a shunt gap within the disk. The module may be used unhoused in under-oil applications or as a component part of a housed arrester. For under-oil applications, the electrode plates are solder sealed to the disk providing a seal preventing oil or moisture from entering the hole in the shunt gap. As an alternate embodiment the surge arrester module may include a series of two or more of such disks stacked between the top and bottom electrode plates.

38 Claims, 3 Drawing Sheets

SURGE ARRESTER WITH SHUNT GAP

BACKGROUND OF THE INVENTION

This application is a continuation-in-part of my prior co-pending application, Ser. No. 07,257,974, filed Oct. 14, 1988 now abandoned.

FIELD OF THE INVENTION

This invention relates to a surge arrester for the protection of distribution circuits and connected equipment, particularly transformers. Alternately, the surge arrester may be used in an application such as riser pole duty to protect an entire cable circuit.

DESCRIPTION OF THE PRIOR ART

Early conventional surge arresters included silicone carbide valve elements arranged in series with gaps encased within a porcelain enclosure. My prior U.S. Pat. No. 3,727,108, issued Apr. 10, 1973, was addressed to an improvement over such conventional arresters employing an elastomeric housing in place of the conventional porcelain housing. The elastomeric housing of my '108 patent incorporated stress relieving elements allowing a more water tight construction while simultaneously providing means for relieving pressure generated internally during overvoltage conditions.

U.S. Pat. No. 4,161,012 to Cunningham, issued July 10, 1979, was an attempt at an improvement over the surge arrester of my prior '108 patent. Cunningham's surge arrester provided an interference fit placing the elastomeric housing in close contact with the stack of arrester disks encased within the housing for reducing corona during overvoltage conditions. Because of the design of the arrester in my '108 patent, such an interference fit was not necessary in my earlier arrester.

U.S. Pat. No. 4,100,588 to Kresge, issued July 11, 1978, discloses a gapless electrical overvoltage surge arrester with metal oxide varistors in the form of solid zinc oxide disks, stacked within elastomeric heat transfer and sinking collars encased by a porcelain housing. The collar configuration leaves space for free arcing in the event of a failure of the arrester while also providing means for dissipating heat from the varistors to the porcelain housing, thereby reducing the rapid generation of gases which would result from a confined arc and the likelihood of a violent failure of the arrester.

U.S. Pat. No. 4,161,763 to Stetson, issued July 17, 1979, discloses a compact voltage surge arrester employing a high impedence miniaturized series gap electrode arrangement in silicone carbide disks in series with a plurality of zinc oxide varistors. Arrester devices employing zinc oxide varistors without gap allow for continuous current flow even when the arrester is in steady state condition generating heat and, thus, require a heat sink such as in the Kresge '588 patent. In Stetson, since the arrester contains zinc oxide varistors that are not continuously connected to ground, but are interrupted by means of a gap structure, there is no continuous heating of the zinc oxide varistors, eliminating the need for a heat sink such as in Kresge.

My prior U.S. Pat. No. 4,240,124, issued Dec. 16, 1980, discloses a surge arrester employing a stack of metal oxide varistors in series with a shunt gap encased within an elastomeric housing arranged in a manner to prevent overheating during normal service conditions. The arrester provides an interference fit between the varistors and the elastomeric housing. Generation of heat is minimized utilizing one or more supplementary varistor disks which effectively increase the overall resistance of the arrester. During normal conditions, the leakage current drawn through the varistor disks is sufficiently small and the dissipation of heat through the elastomeric housing is sufficiently great that thermal failure of the device is prevented.

In the subsequent years, new uses in more severe environments have been found for metal oxide varistor (MOV) arresters. These include: (1) under-oil applications in distribution transformers with ambient temperatures as high as 140° C., the negative temperature coefficient of resistance for the MOV material necessitating the use of extra MOV block resistance resulting in a corresponding increase in protective characteristics; (2) Pad mounted transformer compartment applications with ambient temperatures up to 90° C. where again there is a need to increase block resistance at a sacrifice of arrester protective levels; (3) unanticipated dynamic system voltage increase with potential to exceed the arrester's maximum continuous operating voltage (MCOV) caused by effects of, for example, low levels of ferroresonance, non-effectively grounded systems, loss of load, and inadequate regulation; and (4) degradation by frequent surge duty when applied in high lightning areas showing an unanticipated increase in leakage current and watts loss.

Since the development of the earlier arresters, there has developed some concern for their aging characteristics and the potential for thermal runaway, particularly in the more severe environments and especially for the continuously conducting gapless metal oxide device. Aging can be accelerated because of swings in voltage as well as high ambient temperatures.

As a result, there has developed an interest and a need by major utilities in specifying an economical enhancement for arrester product performance without a sacrifice in protective response and for reduced arrester sensitivity to operating temperatures and temporary/sustained elevated operating voltages. These and other objects are met by my present invention described below.

SUMMARY OF THE INVENTION

It is, therefore, a primary object of my present invention to provide an arrester having increased tolerance to the extremes of temperature and voltage without an increase in its protective response.

Another object of this invention is to provide an arrester having up to a two-decade improvement in operating life for a given ambient temperature.

A further object of this invention is to provide an arrester which allows for a significant increase in its maximum continuous operating voltage.

A still further object of this invention is to provide an arrester having a dramatic improvement in temporary overvoltage (TOV) characteristics without sacrificing the protective characteristics of the arrester at coordinating surge values.

Still another object of this invention is to provide an arrester whose performance is characterized by a substantial reduction in watts loss.

Another object of this invention is to provide an arrester which offers an opportunity to improve the protective response of arrester designs not requiring duty enhancements.

A further object of this invention is to provide an arrester module usable to lower the protective response of the standard arrester as desired for special applications such as riser pole duty.

A still further object of this invention is to provide an arrester module usable in both under-oil applications as well as in housed arrester designs which will provide all of the above objects.

The preferred embodiment of my surge arrester module includes one or more metal oxide varistor (MOV) disks having a coaxial shunt gap located within the disk or disks. In one embodiment of my invention, a single MOV disk has a hole located essentially, though not necessarily, through the center of the disk and includes top and bottom electrode plates having centrally located projections which protrude inwardly of the disk into the hole in the disk, thereby forming a shunt gap within the disk. For under-oil applications, the electrodes of this shunt gap module are preferably solder sealed to the top and bottom surfaces of the MOV disk providing a seal preventing oil or moisture from entering the hole and the shunt gap. The shunt gap module may also be used in addition to and in series with the stack of MOV blocks in a conventional housed arrester to provide the objects stated above. Alternatively, my shunt gap module employing a single MOV disk may be used in place of one of the MOV blocks within the housed arrester to provide reduced protective response for applications such as riser pole duty.

In a second embodiment of my invention, two or more MOV disks having a co-axial hole bored through the disks are stacked and a pair of electrode plates having similar projections which protrude into the hole in the stack are located on the top and bottom of the stack. In this manner, for example, my shunt gap module may be formed of a pair of stacked MOV disks with a single shunt gap located therein.

When operating at a given duty cycle rating, in its quiescent stage without voltage surge, the module is continuously conducting through the MOV disk. However, when subjected to temporary overvoltage, sparkover occurs at the shunt gap short-circuiting the MOV disk or disks of the module. This construction is entirely different from that practiced earlier with the series gap type silicone carbide arrester. In such construction, the function of the resistance and capacitor grading modules is to equalize the voltage distribution between all of the series gaps to ensure a consistent sparkover time independent of external contamination. The impedence of gap structure is so high that in the quiescent state the silicone carbide arrester remains in an essential non-conducting mode.

These and other objects and advantages of the arrester design of my present invention will become apparent upon reading the accompanying detailed description of the preferred embodiment with reference to the attached drawings described below.

DETAILED DESCRIPTION OF THE PREFERRED EMBODIMENT

Figure 1:
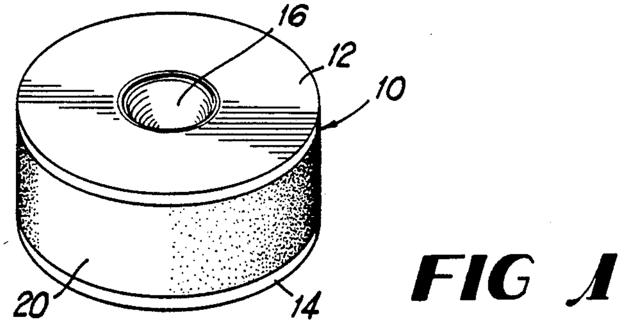
FIG. 1 is a perspective view of a surge arrester module of my present invention.
Figure 2:
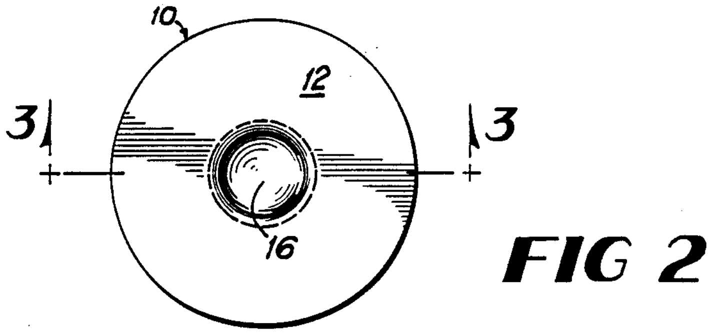
FIG. 2 is a top plan view of my surge arrester module of FIG. 1.
Figure 3:
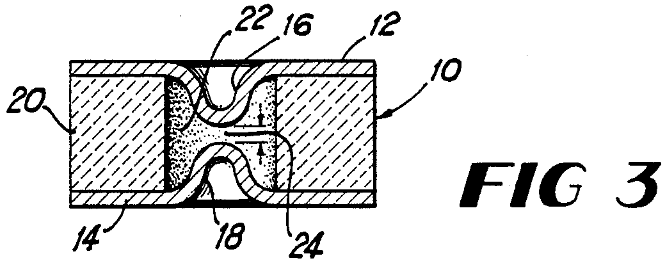
FIG. 3 is a cross-sectional view taken along lines A—A of FIG. 2.

Referring now more specifically to the drawings, wherein like reference numerals have been used to refer to like parts, and to FIGS. 1–3 in particular, numeral 10 designates generally one embodiment of the surge arrestor module of my present invention. This embodiment of my surge arrestor module includes a generally disk shaped metal oxide varistor 20 having a hole 22 passing therethrough. In its preferred embodiment, the hole 22 passes through the center of the MOV disk 20. The disk includes a top electrode plate 12 and a bottom electrode plate 14, both of which in one embodiment of my invention may be fixed to the disk 20 by means of a conductive joint 15, such as solder joint. The top and bottom electrodes include inwardly protruding opposed projections or dimples 16, 18 which protrude into the hole 22 within the MOV disk 20. The interior surfaces of the dimples 16, 18 are spaced apart so as to form a shunt gap 24 therebetween. Hole 22 and electrode projections 16,18 do not need to pass through the center of the disk, so long as they are arranged to short circuit the disk 20 on sparkover across the gap 24.

The conductive and joint 15 serves to create an impenetrable seal around the hole in the disk preventing penetration of water or oil into the hole and gap. Unlike some prior art arresters, it is not necessary to backfill the hole 22 with an inert gas. It is possible that the arrester module can be sealed with dry, ambient air within the hole.

The preferred material of construction for disk 20 is a highly non-linear ceramic resistor device, such as a zinc oxide varistor, manufactured by McGraw-Edison. The electrode plates 12, 14 are preferably made of copper.

Thus, the sealed construction embodiment of my arrester module makes it particularly appropriate for use unhoused in oil immersible applications, such as an internal device in the hot oil of a distribution transformer. The solder joint prevents the seepage of oil into the hole and gap. While on the other hand, the gap is sufficient to sparkover on the passage of a pre-determined surge current through the arrester. In normal steady state conduction, before and after temporary overvoltage surge current conditions, the arrester is continuously conducting. However, on temporary overvoltage caused by, for example, a lightning strike, sparkover will occur at the gap 24 in the arrester short circuiting the MOV disk 20 and protecting the circuit from overvoltage. The sparkover of the shunt gap 24, being located within the MOV disk 20, is beneficially stabilized by the adjacent cylindrical wall of the non-linear resistance material of the disk.

Figure 4:
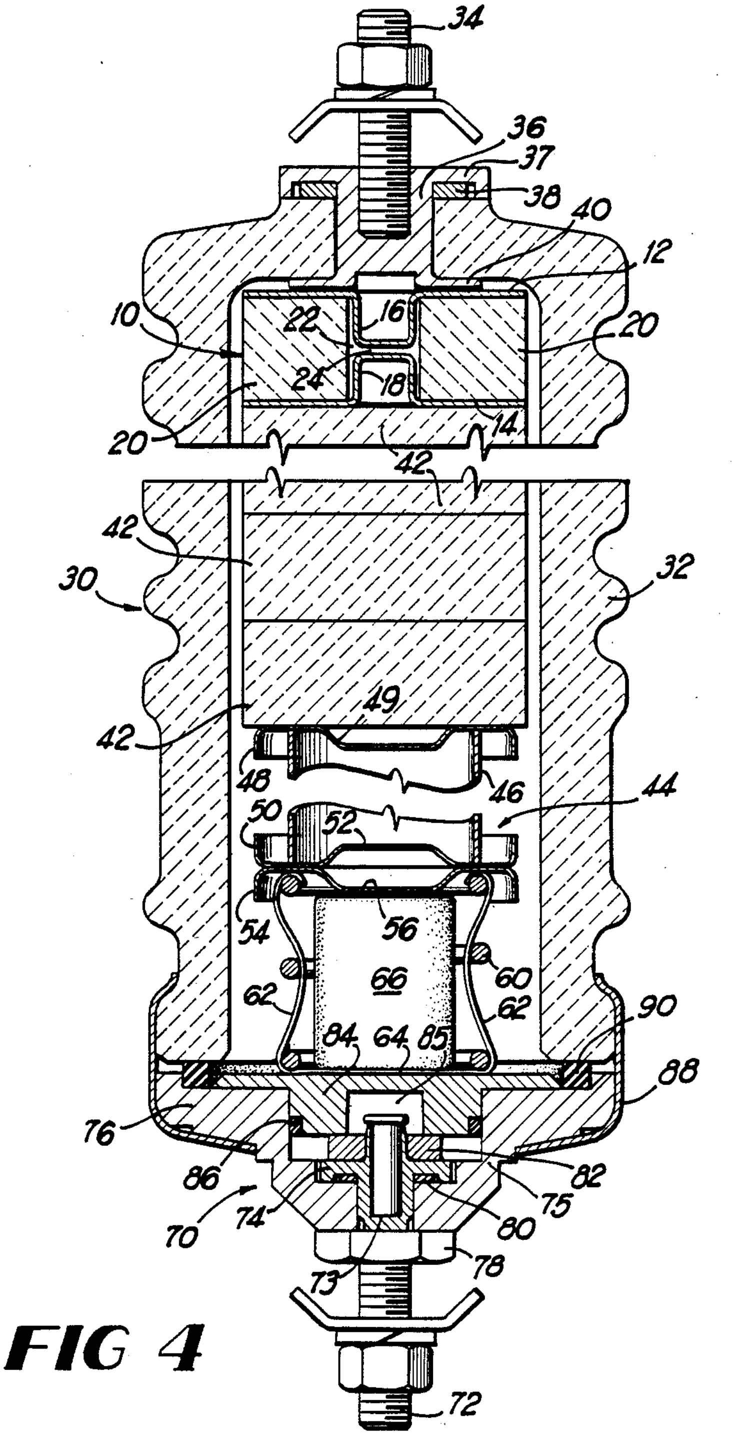
FIG. 4 is a cross-sectional view of one embodiment for a housed arrester employing a surge arrester module of the present invention.

The arrester module of my present invention is not limited to under oil applications as an internal device, but may also be a component part of an external housed arrester 30, such as shown in FIG. 4. The preferred embodiment of a housed arrester incorporating my surge arrester module 10 described above includes a porcelain housing 32 having mounted in its opposed ends a line terminal stud 34 and a ground terminal stud 72. The line terminal stud 34 is anchored in an insert 36 having an outwardly extending recessed collar 37 covering the line terminal end of the porcelain housing. A gasket 38 is located within the recess of the collar 37 between the collar 37 and the end of the housing. The insert 36 is held into place by crimping under load forming an interior retaining collar 40. By crimping insert 36 under load the gasket 38 is held under compression sealing the line terminal end of the arrester 30 from its environment.

Within the housing and in electrical contact with insert 36 is my surge arrester module 10 of FIGS. 1–3 described above including the MOV disk 20 having a hole 22 and top and bottom electrode plates 12, 14 with opposed inwardly projecting dimples 16, 18 forming the sparkover gap 24 within the hole of the disk 20. In this housed arrester embodiment, it is not necessary to seal the electrode plates 12, 14 to the disk 20 because the porcelain housing 32 is itself sealed from its environment.

In contact with the bottom electrical plate 14 of the arrester module, adjacent the side of disk 20 opposite insert 36, is a series of stacked solid MOV blocks 42, the number of which is generally determined by the desired kV rating of the arrester 30. Stacked in series with the MOV blocks within the housing 32 is a spacer assembly 44 having electrically conductive side walls 46 preferably of aluminum, and top and bottom electrically conductive plates or pressure pads 48, 50, preferably of copper. The pads 48, 50 have inwardly projecting dimples 49, 52 which serve to center the pads on the spacer side walls. The length of the spacer assembly 44 is generally determined by the physical height of the porcelain housing and the surge arrester module 10 and the number of MOV blocks 42 necessary for the kv rating of the arrester 30.

In contact with the bottom pad 50 of the spacer assembly 44 is an opposed conductive copper pad 54 having an inwardly projecting dimple 56, projecting away from the dimple 52 in pad 50. A compression spring 60 maintains the internal parts of the housed arrester under pressure and, thereby, in electrical contact. The spring also allows for thermal expansion and contraction of these internal parts on loading and on changes in ambient temperature.

The dimple 56 aids in centering the pad 54 on the spring 60. Contained within the compression spring 60 is a dessicant capsule 66 to aid in maintaining a moisture free environment within the housing of the arrester. A conductor 62 in the form of a strip of copper interwoven with the compression spring 60 constitutes a shunt electrically connecting the ground lead disconnector assembly 70, including ground stud 72, with the line terminal stud 34. To assure adequate contact with the ground lead disconnector assembly 70, the conductor 62 is formed having a flat end surface 64 wrapped around the end of the compression spring 60 opposite the conductive plate 54.

The ground lead disconnector assembly 70 includes the ground stud 72 anchored within the ground lead disconnector housing 76. The external portion of the ground stud 72 is threaded. The internal portion of the ground stud 72 includes an outwardly projecting recessed collar 74. In the interior end of the ground stud is a bore into which an explosive cartridge 73 is pressure fitted. Inserts 80 formed as an internal part of the ground lead disconnector housing fit inside the recess of the collar 74. Nut 78 secures ground stud 72 in place in the housing 76. The inserts 80 key into the collar 74 to prevent spinning of the stud when tightening the nut 78.

Electrically conductive washer 82 is located around the interior end of the ground stud 72. Inserted on top of the washer 82 into the large diameter bore of the ground lead disconnector housing 76 is the ground lead electrode 84 which provides electrical continuity between the end surface 64 of shunt 62 and the ground lead disconnector assembly 70. The electrode 84 includes a centrally located cavity 85 into which the interior end of the ground stud 72 including cartridge 73 fits. The electrode 84 is inserted into the ground lead disconnector housing 76 under vacuum placing O-ring 86 under load and providing an airtight seal in the ground lead disconnector assembly 70. On failure of the arrester 30 to interrupt 60 Hz current flow, the cartridge 73 will overheat and explode separating the stud at its weakened section 75 and blowing away the ground terminal to the stud 72. The space in the cavity 85 between the cartridge 73 and the electrode 84 allows for expansion of gases upon explosion of the cartridge.

Aluminum outer cap 88 encases the ground lead disconnector housing 76 and a portion of the lower end of the porcelain housing 32. The outer cap is crimped under pressure over the bottom of the housing 32 serving to maintain the ground lead disconnector assembly 70, and particularly washer 82 and electrode 84, in contact with the end surface 64 of conductor 62. Gasket 90 is thereby placed under load sealing the ground terminal end of the housing 32. The components of the housed arrester 30 described above, with the exception of the inclusion of the shunt gap module, are all components of a conventional gapless MOV arrester.

In its quiescent state, when just conducting without surge, the voltage drop across the module 10 is its proportionate share of the total voltage drop across the arrester 30. Thus, for a 10 kV arrester having four MOV blocks 42 plus the arrester module 10, the module's proportionate share of the voltage drop is 2 kV if the arrester is operating at its duty cycle rating of 10 kV.

The shunt gap 24 spacing, whether designed for use under oil or in a housed arrester, preferably is adjusted to have a 60 Hz sparkover nominally 50% greater than the duty cycle voltage rating of the MOV disk 20 without the gap. On the other hand the gap 24 cannot be so large as to defeat impulse sparkover. This assures gap withstand under conditions of normal and abnormal operating voltages.

There is an intrinsically variable delay in the shunt gap sparkover at very low levels of surge current where the impulse current flow is on the order of hundreds of amperes. Surge current flow of 1000 A and greater and indeed through the maximum withstand level of 100 kA results in consistent shunt gap sparkover very early in the conduction of the applied surge such that the protective response of the module 10 is indistinguishable from the response of a similarly dimensioned MOV disk without the shunt gap. Characteristics of my housed arrester 30 are shown in Table I. Comparative results of test performance of my housed arrester 30 to a conventional gapless MOV arrester for 3 current levels are shown in Table II.

TABLE I

| TYPE ED-ENHANCED DURABILITY ARRESTER REPRESENTATIVE RATINGS | | | | | | | | |
|---|---|---|---|---|---|---|---|---|
| Surge Arrester Duty Cycle Rating (kV-RMS) | Surge Arrester MCOV Rating (kV-RMS) | Maximum Equivalent Front-of Wave Protective Level (kV-Crest) | Maximum Discharge Voltage (kV-Crest) @ 5 kA | @ 10 kA | @ 20 kA | @ 40 kA | TOV Capability (sec) 1.2 PU | 1.3 PU |
| 9 | 7.65 | 34 | 28 | 30.5 | 34 | 38 | 8000 | 900 |
| 18 | 15.30 | 62 | 52 | 56 | 62 | 70 | 800 | 60 |
| 27 | 22 | 96 | 80 | 87 | 96 | 108 | 250 | 17 |

TABLE II

| COMPARISON OF TEST RESULTS DISCHARGE VOLTAGE | | | |
|---|---|---|---|
| 9 kV Arrester Construction | 1 kA 8 × 20 Discharge-kV Crest | 10 kA 8 × 20 Discharge-kV Crest | 40 kA 8 × 20 Discharge-kV Crest |
| 4 Blocks | 23.7 | 30.2 | 42.4 |
| 4 Blocks plus shunt gap | 23.4 | 30 | 43.5 |
| 5 Blocks | 29.2 | 36.7 | 49.8 |

Tests show that a 20% increase in block resistance in my housed arrester 30 results in approximately ten to one reduction in leakage current flow under steady state conditions at surge arrester rated voltage. Additionally, the Arrhenius equation is usable to predict a two-decade improvement in operating life for a given ambient temperature. The performance is further characterized by a measured 70% reduction in watts loss due to the nominal ten to 1 reduction in steady state current flow. Such a heat loss reduction also provides the utilities with reduced operating losses. The temporary overvoltage (TOV) characteristics are included in Table I. The increase in steady state resistance is further usable to compensate for the extra block additions required for the high temperature environment for under-oil arrester assemblies and elastomeric dead front arresters.

As seen from Table II comparing the performance of my present invention to a conventional gapless MOV arrester, the addition of the surge arrester module 10 into the arrester 30 did not increase the protective level of a 10 kv zinc oxide arrester in tests up through 40 kA using a 8×20 microsecond wave. At the high current levels there was no measured increase in arrester discharge voltage. Tests at very low levels of current flow showed an increase in discharge voltage due to an occasional delay in the sparkover of the gap but the increase resulted in a total protective response less than that found in the 10 kA protective level. The 10 kA surge protective level is frequently used as the value to base insulation coordination studied. Therefore, any protective response equal to or below this value is unimportant.

The gap 24 short circuits the MOV disk 20 limiting the protective level of the arrester to a value equivalent to that of an arrester assembly constructed without the surge arrester module 10. Thus, in normal steady state conduction (before and after surge current conduction) the arrester leakage current can be reduced without sacrificing the Protective level of the arrester. This increases the safety factor for more reliable application where unexpected dynamic system overvoltages might cause premature arrester failure. For example, the arrester design employing the surge arrester module would permit the use of an arrester assembly where the steady state leakage current of an 18 kV arrester could be made to correspond to that of a conventional gapless 25 kV MOV arrester yet the arrester's protective response would correspond to that of a conventional gapless 18 kV MOV arrester.

As an alternative arrester design having a reduced protective response, a shunt gap module may be used to replace an MOV block in each 9 kV arrester proration in the standard heavy duty class distribution arrester. This replacement yields a lowering of the protective response up to 20% while essentially retaining the MCOV and TOV characteristics of the standard arrester. An arrester of this alternate design is suitable for riser pole duty where a single arrester is used to protect the entire cable circuit and for protection of higher voltage systems located in areas of severe lightning duty where there is a need to lower the failure rate of the connected equipment. Operating characteristics for this alternate design are shown in Table III.

TABLE III

| TYPE RP - RISER POLE ARRESTER - REPRESENTATIVE RATINGS | | | | | | | | |
|---|---|---|---|---|---|---|---|---|
| Surge Arrester Duty Cycle Rating (kV-RMS) | Surge Arrester MCOV Rating (kV-RMS) | Maximum Equivalent Front-of Wave Protective Level (kV-Crest) | Maximum Discharge Voltage (kV-Crest) Using an 8 × 20 sec Current Wave @ 5 kA | @ 10 kA | @ 20 kA | @ 40 kA | TOV Capability (sec) 1.2 PU | 1.3 PU |
| 10 | 8.40 | 29 | 24 | 26 | 30 | 36 | 25 | 1 |
| 18 | 15.30 | 57 | 46 | 50 | 56 | 63 | 25 | 1 |
| 27 | 22 | 91 | 74 | 80 | 90 | 101 | 25 | 1 |

Figure 5:
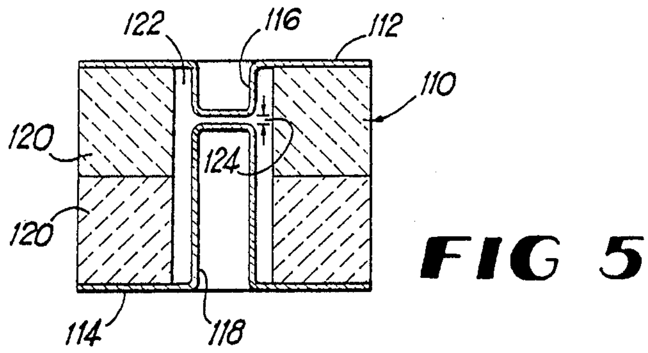
FIG. 5 is a cross-sectional view of an alternate embodiment of my surge arrester module.

Shown in FIG. 5 is a cross-sectional view of an alternate embodiment of my surge arrester module shown in FIGS. 1–3. In this alternate embodiment the module 110 is comprised of two MOV disks 120 stacked end to end having a hole 122 passing through both disks. Electrode plates 112, 114 are located at the top and bottom, respectively, of the MOV stack. The electrode plates include inward projections 116, 118 forming a shunt gap 124 within the stack of disks. The module 110 may similarly be sealed to provide a secure environment for the gap 124. Of course, more than two disks 120 may be stacked to form this module.

Figure 6:
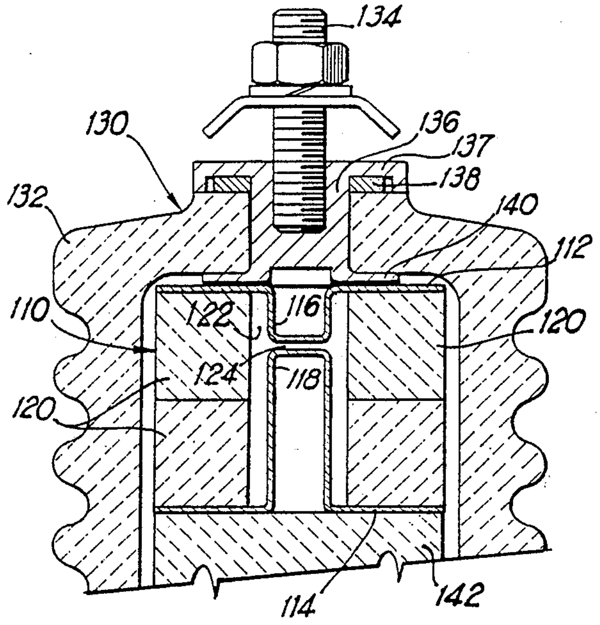
FIG. 6 is a partial cross-sectional view of a housed arrester employing the alternate embodiment of my surge arrester module of FIG. 5.

Just as my surge arrester module 10 shown in FIGS. 1–3, this alternate embodiment module 110 may be employed in a housed arrester configuration similar to that shown in FIG. 4. FIG. 6 is a partial cross-sectional view of an alternate embodiment housed arrester employing module 110 which view corresponds to the portion of the housed arrester 30 located above the break line in FIG. 4. The arrester 130 in FIG. 6 includes the same corresponding elements as arrester 30 in FIG. 4, such as, housing 132 and terminal stud 134 anchored in insert 136. The only difference between FIG. 4 and FIG. 6 is the substitution of stacked module assembly 110 for surge arrester module 10. The remaining components of the housed arrester remain the same.

Figure 7:
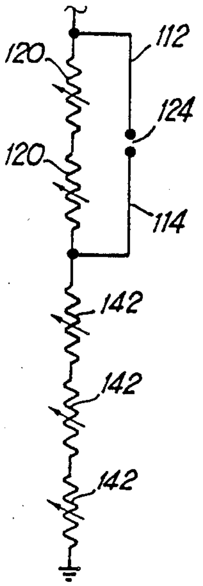
FIG. 7 is an electrical schematic of a 9 kV housed arrester employing my surge arrester of FIG. 5.

The conventional 9 kV MOV arrester is a gapless arrester comprised of four MOV disks, each duty cycle rated at 2.25 kV. In the case where my arrester is constructed of MOV disks each duty cycle rated at 2.25 kV, the 9 KV arrester proration would have 5 MOV disks with the shunt gap located across the top two disks as shown schematically in FIG. 7. My preferred construction of FIGS. 6 and 7 would, therefore, add nominally 25% more MOV disk material over what would normally be employed in each conventional 9 kV arrester proration, to make the arrester less sensitive to TOV. The shunt gap would short the 25% added resistance material plus 25% of the standard MOV stack leaving then only a 75% MOV resister stack to develop discharge voltages from surge currents. Similarly, a 27 kV arrester of the present invention may include three shunt gap modules 110 in series with 9 gapless MOV disks.

It can be seen that the new shunt gap arrester 130 has one more disk for each 9 kV arrester proration. In the steady state condition the extra disk in the present invention reduces the current flow by some 20%, resulting in a 60% reduction in watts loss compared to the conventional gapless 9 kV MOV arrester. In this respect it may be likened to the use of a 12 kV arrester on the lower voltage system. This configuration provides a remarkable tolerance for temporary overvoltages on the lower voltage system to which it is applied. Under the presence of a surge current, the discharge voltage of my 9 kV arrester 130 is generated entirely by the three remaining disks 142 yielding a protective response with some equivalence to that of a 6 kV MOV arrester or 25% below that of a conventional 9 kV arrester.

Characteristics of the arrester 130 employing the stacked module 110 are shown in Table IV. Comparative test results of the same arrester 130 are listed in Table V for three alternative construction types. The results shown in Tables IV and V show the benefits of the stacked shunt gap construction of FIGS. 5–7. Specifically, the stacked module 110 of my present invention achieves both improved protective level and improved reliability over even my surge arrester module 10.

TABLE IV

TYPE RP - SHUNT GAP ARRESTER - REPRESENTATIVE PERFORMANCE

| Surge Arrester Duty Cycle Rating (kV-RMS) | Surge Arrester MCOV Rating (kV-RMS) | Maximum Equivalent Front-of Wave Level* (kV-Crest) | Maximum Discharge Voltage (kV-Crest Using an 8 × 20 @ 1.5 kA | @ 3 kA | @ 5 kA | @ 10 kA | @ 20 kA |
|---|---|---|---|---|---|---|---|
| 9 | 7.65 | 23.5 | 17.5 | 19 | 20 | 21.5 | 23 |
| 10 | 8.40 | 26 | 20 | 21 | 22 | 23.5 | 25 |
| 12 | 10.20 | 35 | 27 | 28 | 29 | 31 | 34 |
| 15 | 12.70 | 44 | 32 | 34 | 36 | 39 | 43 |
| 18 | 15.30 | 49 | 36 | 38 | 40 | 44 | 48 |
| 21 | 17 | 59 | 44 | 46 | 48 | 53 | 58 |
| 24 | 19.50 | 66 | 50 | 53 | 56 | 60 | 65 |
| 27 | 22 | 71 | 53 | 56 | 59 | 65 | 70 |

*Maximum discharge voltage for a 10 kV impulse current producing a voltage wave cresting in 0.5 μsec.

TABLE V

DISCHARGE VOLTAGE COMPARISON OF TEST RESULTS

| 9 kV Arrester Construction | 1 kA 8 × 20 Discharge-kV Crest | 10 kA 8 × 20 Discharge-kV Crest | 40 kA 8 × 20 Discharge-kV Crest |
|---|---|---|---|
| 4 Blocks | 23.7 | 30.2 | 42.4 |
| 3 Blocks plus shunt gapped double block | 17.2 | 22.4 | 31.5 |
| 5 Blocks | 29.2 | 36.7 | 49.8 |

It now becomes apparent that the above described illustrative embodiments of my arrester with shunt gap is capable of obtaining the above stated objects and advantages. It is obvious that those skilled in the art may make modifications in the details of construction without departing from the spirit of the invention which is to be limited only by the scope of the appended claims.

What is claimed is:

1. An electric surge arrester comprising:

a varistor having top and bottom sides and a hole therethrough, the hole passing through both the top and bottom sides;

a pair of opposed, spaced apart electrodes attached to the top and bottom sides of the varistor at least one of the electrodes having a dimple projecting inwardly into said hole in said varister providing a shunt gap between the pair of opposed electrodes within said varistor; and a conductive joint attaching each of the electrodes to their associated side of the varistor, the joints sealing the hole in the disk and preventing oil or water outside the disk from entering said hole.

2. An electric surge arrester as defined in claim 1, wherein the electrodes are made of copper.

3. An electric surge arrester as defined in claim 1, wherein the conductive joints are solder joints.

4. An electric surge arrester as defined in claim 1, wherein the varistor is made of a non-linear ceramic device.

5. An electric surge arrester as defined in claim 1, wherein the varistor is a zinc oxide based resistor.

6. An electric surge arrester as defined in claim 1, wherein the shunt gap spacing is adjusted to have a 60 Hz sparkover nominally at least about 50% greater than the duty cycle voltage rating of the varistor without the gap.

7. An electric surge arrester as defined in claim 1, wherein an inert gas is sealed with the hole in the disk.

8. An electric surge arrester as defined in claim 1, wherein the varistor is a stack of two or more varistor disks, said hole passing therethrough.

9. An electric surge arrester comprising:

a varistor having at least two sides and a hole therethrough, the hole passing through at least two of the sides of the varistor; and a pair of electrodes, one of the electrodes being in electrical communication with one side of the varistor having the hole therethrough and the other electrode being in electrical communication with the second side of the varistor also having the hole therethrough, at least one of the electrodes having a projection protruding inwardly into said hole in said varistor providing a shunt gap between the pair of opposed electrodes within said varistor.

10. An electric surge arrester as defined in claim 9, further including a conductive joint attaching each of the electrodes to their associated side of the varistor, the joints sealing the hole in the disk and preventing oil or water outside the disk from entering said hole.

11. An electric surge arrester as defined in claim 9, wherein the electrodes are made of copper.

12. An electric surge arrester as defined in claim 10, wherein the conductive joints are solder joints.

13. An electric surge arrester as defined in claim 9, wherein the varistor is made of a non-linear ceramic device.

14. An electric surge arrester as defined in claim 9, wherein the varistor is a zinc oxide based resister.

15. An electric surge arrester as defined in claim 9, wherein the shunt gap spacing is adjusted to have a 60 Hz sparkover nominally at least about 50% greater than the duty cycle voltage rating of the varistor without the gap.

16. An electric surge arrester as defined in claim 10, wherein an inert gas is sealed with the hole in the disk.

17. An electric surge arrester as defined in claim 9, wherein the varistor is a stack of two or more varistor disks, said hole passing therethrough.

18. An electric surge arrester module as defined in claim 13, wherein the electrodes are made of copper.

19. In a housed arrester, an electric surge arrester module comprising:

a varistor having at least two sides and a hole therethrough, the hole passing through at least two of the sides; and a pair of opposed, spaced apart electrodes, each one of said electrodes being in electrical communication with a given one of the two sides of the varistor having said hole passing therethrough, at least one of the electrodes having a projection inwardly projecting into said hole in said varistor providing a shunt gap between the pair of opposed electrodes within said varistor.

20. An electric surge arrester module as defined in claim 19, further including a conductive joint attaching each of the electrodes to its associated side of the varistor, the joints sealing the hole in the disk and preventing oil or water outside the disk from entering said hole.

21. An electric surge arrester module as defined in claim 20, wherein the conductive joints are solder joints.

22. An electric surge arrester module as defined in claim 19, wherein the varistor is made of a non-linear ceramic device.

23. An electric surge arrester module as defined in claim 19, wherein the varistor is a zinc oxide based resistor.

24. An electric surge arrester module as defined in claim 19, wherein the shunt gap spacing is adjusted to have a 60 Hz sparkover nominally at least about 50% greater than the duty cycle voltage rating of the varistor without the gap.

25. An electric surge arrester module as defined in claim 20, wherein an inert gas is sealed with the hole in the disk.

26. An electric surge arrester module as defined in claim 19, wherein the varistor is a stack of two or more varistor disks, said hole passing therethrough.

27. A surge arrester comprising a housing, a metal oxide varistor disk having top and bottom sides and a hole therethrough including the top and bottom sides of the disk, a pair of opposed, spaced apart electrodes, one of the electrodes in electrical communication with the top side of the disk and the other electrode in electrical communication with the bottom side of the disk, at least one of the electrodes having a projection protruding inwardly into said hole in said varistor disk electrically providing a shunt gap between the pair of opposed electrodes within said varistor disk, means for closing the housing, and conducting terminals electrically connected to said metal oxide varistor disks contained within the housing.

28. A surge arrester as defined in claim 27, and at least one solid metal oxide varistor block electrically connected in series within said housing with the metal oxide varistor disk.

29. A surge arrester as defined in claim 27, wherein the metal oxide varistor disk is made of a non-linear ceramic device.

30. A surge arrester as defined in claim 28, wherein the metal oxide varistor disk and block are made of a non-linear ceramic device.

31. A surge arrester as defined in claim 27, wherein the metal oxide varistor disk is made of zinc oxide.

32. A surge arrester as defined in claim 28, wherein the metal oxide varistor disk and block are made of zinc oxide.

33. A surge arrester as defined in claim 27, wherein a conductive joint attaches each of the electrodes to its associated side of the metal oxide varister disk having a hole passing therethrough, the joints sealing the hole in said varistor disk and preventing oil or water outside of said varistor disk from entering said hole.

34. A surge arrestor as defined in claim 27, further including a dessicant capsule within the housing.

35. An electric surge arrester as defined in claim 27, wherein the shunt gap spacing is adjusted to have a 60 Hz sparkover nominally at least about 50% greater than the duty cycle voltage rating of the varistor disk without the gap.

36. In a surge arrester comprising a housing, a plurality of varistors electrically connected in series within said housing, means for closing the housing and conducting terminals electrically connected to said varistors contained within the housing, the improvement comprising, at least one of said varistors having top and bottom sides and a hole passing therethrough including the top and bottom sides of the disk, a pair of opposed, spaced apart conducting electrodes, one of the electrodes in electrical communication with the top side of the varistor having the hole therethrough and the other electrode in electrical communication with the bottom side of the varistor having the hole therethrough disk, at least one of the electrodes having a projection protruding inwardly into said hole providing a shunt gap between the pair of opposed electrodes within said varistor having the hole therethrough.

37. In a surge arrester as defined in claim 36, wherein two or more metal oxide varistors are stacked between said electrodes, each of the varistors in said stack having a hole therethrough, all of the holes in the varistors between said electrodes being in communication in series with each other, said projection providing a shunt gap within the series of holes in the stack of varistors.

38. In a housed arrester, an electric surge arrester module comprising:

a varistor having a top and bottom sides and a hole therethrough, the hole passing through both the top and bottom sides; and a pair of opposed, spaced apart electrodes in electrical communication with the top and bottom sides of the varistor, at least one of the electrodes having a projection protruding inwardly into said hole in said varistor providing a shunt gap between the pair of opposed plates within said varistor;

said module in its quiescent state when operating at a given duty cycle rating being continuously conducting through said varistor but when subjected to temporary overvoltage said varistor being short circuited by sparkover occuring at the shunt gap.

* * * * *